United States Patent
Piper

(10) Patent No.: US 9,418,427 B2
(45) Date of Patent: Aug. 16, 2016

(54) POPULATION-GUIDED DEFORMABLE REGISTRATION

(71) Applicant: MIM Software Inc., Cleveland, OH (US)

(72) Inventor: Jonathan William Piper, Cleveland Heights, OH (US)

(73) Assignee: MIM SOFTWARE INC., Cleveland, OH (US)

( * ) Notice: Subject to any disclaimer, the term of this patent is extended or adjusted under 35 U.S.C. 154(b) by 166 days.

(21) Appl. No.: 13/837,111

(22) Filed: Mar. 15, 2013

(65) Prior Publication Data

US 2014/0270424 A1    Sep. 18, 2014

(51) Int. Cl.
G06K 9/00       (2006.01)
G06T 7/00       (2006.01)

(52) U.S. Cl.
CPC ....... G06T 7/003 (2013.01); G06T 2207/30004 (2013.01)

(58) Field of Classification Search
USPC .................................................. 382/128–134
See application file for complete search history.

(56) References Cited

U.S. PATENT DOCUMENTS

| | | | |
|---|---|---|---|
| 2005/0238254 A1* | 10/2005 | Guhring et al. | 382/294 |
| 2005/0249434 A1* | 11/2005 | Xu et al. | 382/294 |
| 2005/0265611 A1* | 12/2005 | Valadez | 382/236 |
| 2006/0030768 A1* | 2/2006 | Ramamurthy et al. | 600/407 |
| 2006/0034500 A1* | 2/2006 | Quist et al. | 382/130 |
| 2007/0013710 A1* | 1/2007 | Higgins et al. | 345/581 |
| 2007/0014456 A1* | 1/2007 | Ramamurthy et al. | 382/128 |
| 2007/0160276 A1* | 7/2007 | Chen et al. | 382/128 |
| 2008/0037843 A1* | 2/2008 | Fu | G06T 7/0038 382/128 |
| 2009/0097778 A1* | 4/2009 | Washburn et al. | 382/294 |
| 2010/0021082 A1* | 1/2010 | Declerck | 382/294 |
| 2010/0260392 A1* | 10/2010 | Wiemker et al. | 382/128 |
| 2011/0268330 A1 | 11/2011 | Piper | |
| 2011/0271215 A1 | 11/2011 | Piper | |
| 2012/0076417 A1* | 3/2012 | Yoshii et al. | 382/190 |

* cited by examiner

*Primary Examiner* — Alex Liew

(74) *Attorney, Agent, or Firm* — Tucker Ellis LLP; Evan Perry

(57) ABSTRACT

A registration technique is provided that can combine one or more related registrations to enhance accuracy of a registration of image volumes. A registration relationship between a first source volume and a target volume and a registration relationship between the first source volume and a second source volume are concatenated to provide an estimate of a registration relationship between the second source volume and the target volume. The estimate is utilized to inform the direct registration of the second source volume to the target volume or utilized in place of the direct registration.

21 Claims, 9 Drawing Sheets

POPULATION-GUIDED DEFORMABLE REGISTRATION

TECHNICAL FIELD

The present disclosure relates to deformable image registration and, more particularly, to an apparatus and method for population-guided deformable registration of medical images.

BACKGROUND

Image registration is a determination of a transformation that aligns locations in one image to locations in another image. In medical imaging, registration is particularly useful to integrate or otherwise correlate information acquired from disparate images. For example, patients images acquired at different times can be compared to understand disease progression, to design therapy strategies, to determine treatment effectiveness, and so on. In another example, patient images can be compared with various reference images (e.g., atlases, normal templates, disease templates, etc.) for diagnostic purposes. While medical imaging technology enables unique views of a patient to be obtained, registration of medical images increases the power of the information.

In a clinical setting, medical image registration can involve intra-subject registration (registration of different images of one patient) and/or inter-subject registration (between different images of different patients or templates). For intra-subject medical imaging, for instance, goals can include tracking disease progression, verifying treatment success, updating contoured or segmented volumes of interest, updating therapy plans, and the like. To achieve these goals, multiple images of a patient can be acquired at different times (e.g., daily, weekly, monthly, etc.). Due to variable patient positioning during imaging, changes due to disease progression or response to therapy, systematic errors in the imaging apparatus, and/or general randomness, the images are not perfectly aligned. Registration corrects the misalignment such that corresponding locations, anatomical structures, etc., between the images are correlated.

According to one example, newly acquired images are registered to a previously acquired image. In this example, each successively obtained image is registered to the same reference image. The reference image can be, for example, a first image acquired of the patient. However, it is to be appreciated that the reverse procedure (i.e., registering previously acquired images or reference images to newly acquired images) can be considered as registering in either direction, i.e. old to new or new to old, provides similar benefits.

Alternatively, each image of the patient can be registered to a reference image not associated with the patient, i.e. an inter-subject registration. For instance, the reference image can be an image selected from a library, such as a representative image or an image generated as a composite or average of multiple images from the library.

However, with any of the techniques described above, a patient image is directly, and individually, registered to the reference image(s) or the reference image(s) are directly and individually registered to the patient image. Errors in identifying corresponding anatomy in two images, i.e. registration errors, can result from differences in how anatomical information is represented in the two images, from imaging system differences, from patient configuration difference, differences in anatomy between different patients, etc. Positional alignment differences can result from registrations of successively obtained images of a patient, even when registered to an identical target.

Accordingly, there is a need for accurate registration mechanisms that reduce variability of alignments from systematic, random, and configuration-based effects.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a registration technique is provided that can combine one or more related registrations to enhance the accuracy of a registration of a two images. To illustrate, consider three image volumes: a target, a first source, and a second source. Given these image volumes, three registration relationships (or six relationships when inverse relationships are included) can be determined. These relationships include the registration of the first source to the target, the registration of the second source to the target, and the registration of the second source to the first source. Each of these relationships is typically determined via a direct and individual relationship. However, according to an aspect, the registration relationship between the first source and the target and the registration relationship between the first source and the second source can be concatenated or combined in some way to provide an estimate of the registration relationship between the second source and the target. The concatenated relationship can be utilized as a final registration relationship between the second source and the target. Alternatively, the estimate is utilized to inform the determination of the actual registration relationship between the second source and the target, via direct registration.

This and other embodiments are described in more detail below.

BRIEF DESCRIPTION OF THE DRAWINGS

These and other aspects are better understood when the following detailed description is read with reference to the accompanying drawings, in which.

DETAILED DESCRIPTION

Figure 1:
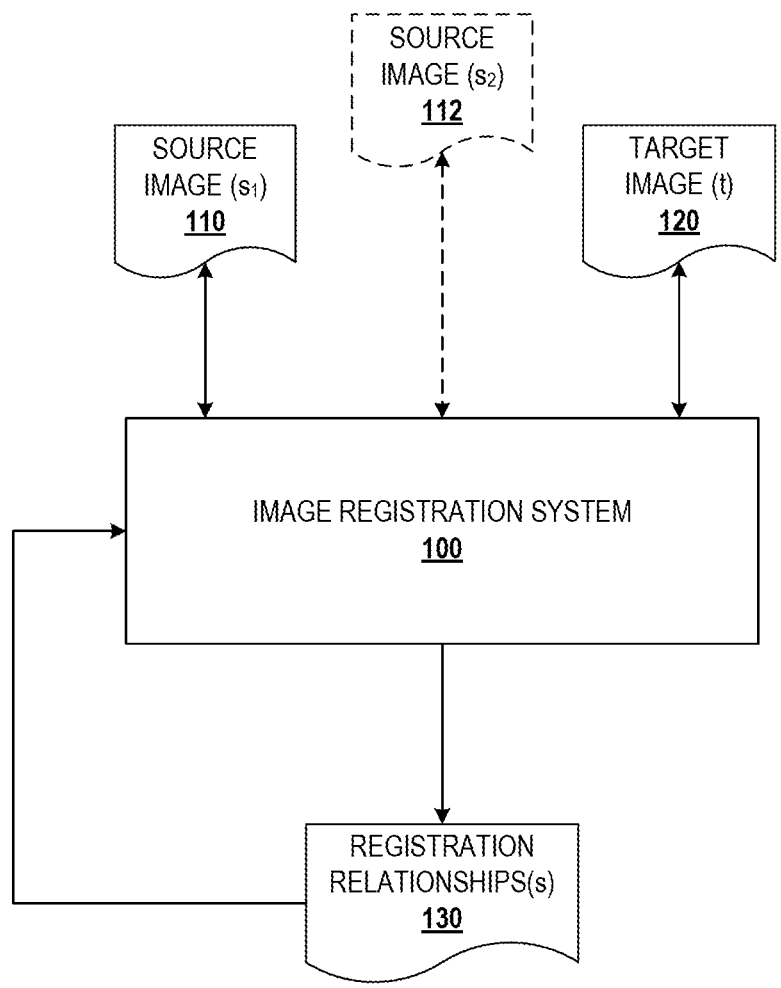
FIG. 1 is a block diagram of an exemplary, non-limiting image registration system configured to implement population-guided registration of image volumes.

Registration of medical images is typically conducted without consideration of corollary data acquired through registration of disparate, but related, medical images. Accordingly, various errors in identifying corresponding anatomy in different medical images are left unchecked. In various, non-limiting embodiments, population forces are introduced in the registration of two or more image volumes. The population forces further influence registration of the two or more image volumes beyond traditional internal forces (e.g., regularization, bendability, etc.) and image forces (e.g., image matching metrics) to improve accuracy of the resultant relationship.

According to an example, relationships associated with related images are utilized to guide the registration of the two or more image volumes, thus providing the aforementioned population forces. More specifically, registration relationships can be concatenated, or chained, such that an estimate of a direct relationship results. According to one aspect, the concatenated relationships are utilized as a final registration relationship. In accordance with an alternative aspect, the estimate can be utilized when computing the actual direct registration relationship.

In addition to providing more accurate relationships, population-guided registrations enable generation of a reference template image volume, which can be virtual. That is, the reference template image volume, itself, does not contain image data. The reference template image volume provides a common template space, which enables appropriate correlation of anatomical structures, while also mitigating template selection bias (i.e., a tendency of a determined registration relationship that correlate a source image to a selected template regardless of accuracy).

In a further aspect, population-guided registration facilitates multiple, simultaneous registration of a source image to a plurality of reference volumes. In some clinical situations, it is desirable to register medical images to a common template space in order to facilitate statistical comparison with normal or diseased databases. However, if images corresponding to different disease states differ significantly, it can be difficult to, for example, register an image of a diseased patient to a reference or template of a normal control. Additionally, having a set of templates respectively associated with different disease states ensures that a template sufficiently similar to the source image exists, but registering two patients to different reference images introduces selection bias. Accordingly, by providing the plurality of reference volumes to a common template space, the source image can be registered to the common template space based on a combination of registration-related information gleaned through individual or combined registrations to each of the reference volumes. This can be achieved by a variety of techniques. For instance, the source image can be individually registered to each reference volume and the individual registrations can be combined in some manner. According to another technique, final registration parameters are determined as a balance of registration parameters, as such parameters would be determined individually, between the source image and each reference volume. As each reference volume exerts a consistent influence on a final registration for all source images, selection bias is mitigated.

In one embodiment, an image registration system is described herein that include a registration engine. The registration engine is configured to obtain a first set of registration relationships respectively mapping between respective source images of a set of images and at least one target image, determine a second set of registration relationships between respective pairs of source images in the set of images, generate a set of estimated registration relationships via respective combinations of a relationship from the first set with a relationship of the second set, and register at least one source image from the set of images to the at least one target image based in part on an associated estimated registration relationship from the set of estimated registration relationships. The image registration system can also include a computer-readable storage medium. The registration engine can be implemented as computer-executable instructions stored on the computer-readable storage medium. In an example, the registration engine determines deformable registrations.

In another example, the registration engine utilizes the associated estimated registration relationship as a final registration relationship between the at least one source image and the at least one target image. A combination of a first registration relationship with a second registration relationship correlates a first location of a first image to a second location of a second image via a third location of a third image, wherein the first registration relationship maps the first location of the first image to the third location of the third image and the second registration relationship maps the third location of the third image to the second location of the second image.

In yet another example, the registration engine is further configured to determine an initial set of registration relationships between respective pairs of source images in the set of images, the initial set being distinct from the second set of registration relationships. Pursuant to this example, the registration engine is further configured to combine respective pairs of registration relationships from the initial set to build an initial set of estimated registration relationships between respective pairs of source images in the set of images. Moreover, the registration engine is further configured to refine the initial set of registration relationships based on the initial set of estimated registration relationships to produce a refined set of registration relationships. The registration engine can also iteratively combine respective pairs of registration relationships from the refined set and update the refined set based on results of a combination.

According to another example, the at least one target image is a plurality of target images registered to a common space and the registration engine is further configured to register source images of the set of images to the plurality of target images to generate a final registration relationship between the source images and the common space, the final registration relationship is based on respective registration relationships between the source images and each target image. Alternatively, the registration engine is further configured to register source images of the set of images to the plurality of target images to generate a final registration relationship between the source images and the common space, the final registration relationship is based on respective registration parameters between the source images and each target image. In this alternative, the source images are registered to the common space according to an equal contributing influence from each of the plurality of target images as a result of registration based on the respective registration parameters.

In further examples, the registration engine is further configured to determine, simultaneously and iteratively, the first set of registration relationships and the second set of registration relationships. The registration engine can also be configured to guide a registration of the at least one source image from the set of images to the at least one target image towards the associated estimate registration relationship. In addition, the computer-readable storage medium further stores thereon a library comprising the set of images. After registration of the at least one source image to the at least one target image, a resultant registration relationship and the at least one target image are added to the library.

According to another embodiment, described herein is a method of registering image volumes. The method can include registering a first image volume to a second image volume and registering a third image volume to the first image volume. The method also includes combining a first registration relationship, between the first image volume and the second image volume, with a second registration relationship, between the third image volume to the first image volume, such that a combination of the first and second registration relationship is an estimated registration relationship between the third image volume and the second image volume. In addition, the method can include registering the third image volume to the second image volume based at least in part on the estimated registration relationship. In an example, the first image volume, the second image volume, and the third image volume are medical images.

In a further aspect, registering can include performing a deformable registration operation. The first image volume and the third image volume are stored in a common library and the method can include pre-registering the third image volume to the first image volume. The method can additional include storing a resultant registration relationship in the common library.

In yet another embodiment, a method of generating a reference template for registration is described. The method can include respectively registering pairs of image volumes of a library of image volumes to generate a first set of intra-library registration relationships, concatenating each registration relationship from the first set of intra-library registration relationships to a selected relationship to build a set of estimated registration relationships to the reference template, and registering image volumes to the reference template based on the set of estimate registration relationships. In an example, the method can also include iteratively concatenating and registering to generate improved accuracy. According to an aspect, for a first iteration, the selected relationship is an identity relationship.

An overview of some embodiments for an image registration system and associated methods has been presented above. These and other exemplary, non-limiting embodiments are hereinafter described in more detail.

Referring now to FIG. 1, illustrated is an exemplary, non-limiting image registration system 100 configured to implement population-guided registration of image volumes. Image registration system 100 determines, for a pair of image volumes, a registration relationship that specifies a transform, or parameters of a transform, by which one image volume of the pair is brought into alignment with the other image volume. In particular, image registration system 100 generates registration relationship(s) 130 from various image volumes input. For example, as shown in FIG. 1, a source image ($s_1$) 110, a source image (s2) 112, and a target image (t) 120 are input to image registration system 100. Though shown in FIG. 1 as being input in parallel, it is to be appreciated that the various image volumes can be input at different times.

As utilized herein, a target image volume such as target image 120 specifies a reference volume or template volume to which other image volumes are to be aligned via registration. A source image volume (e.g., source images 110 and 112) specifies the image volume that undergoes a transform, determined via registration, to align with the target image volume. Though described here that the transforms computed are directional from a source to a target, it is to be appreciated that the various transforms and registration relationships can be computed as directional from a target to a source or may be invertible such that directionality is unimportant.

According to an example, registration relationships 130 can include a first registration relationship between source image 110 and target image 120, a second registration relationship between source image 112 and source image 110, and a third registration relationship between source image 112 and target image 120. In conventional registration systems, the second registration relationship between source image 112 and source image 110 is typically never determined as conventional systems often consider that relationship superfluous. For instance, source image 110 and source image 112 can be images of a subject taken at different times. Conventional applications look to register those images to a common target, e.g., target image 120, to enable comparison and do not register the images with each other. However, as shown in FIG. 1, registration relationships 130, determined by image registration system 100, feedback to image registration system 100, which utilizes the generated registration relationships 130 to determine other relationships.

Figure 2:
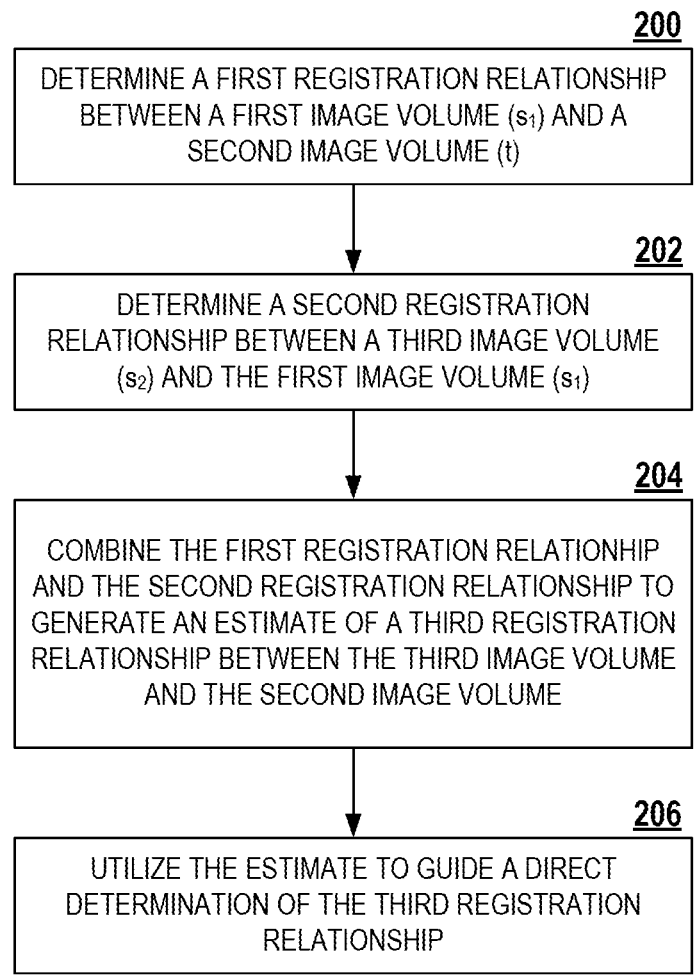
FIG. 2 is a flow diagram illustrating an exemplary, non-limiting embodiment for registering two image volumes based on an estimate derived from related registration relationships.

Turning to FIG. 2, illustrated is a technique by which image registration system 100 utilizes already generated registration relationships to determine new relationships according to one non-limiting, exemplary embodiment. At 200, a first registration relationship between a first image volume (e.g., source image 110, also denoted herein as "$s_1$") and a second image volume (e.g., target image 120 or "t") is determined. The first registration relationship specifies a transform, or parameters of a transform, whereby locations, structures, landmarks, regions, sub-regions, pixels, voxels, etc. in the first image volume are mapped to corresponding locations, structures, landmarks, regions, sub-regions, pixels, voxels, etc. of the second image volume. At 202, a second registration relationship between a third image volume (e.g., source image 112, also denoted herein as "$s_2$") and the first image volume $s_1$ is determined.

Figure 3:
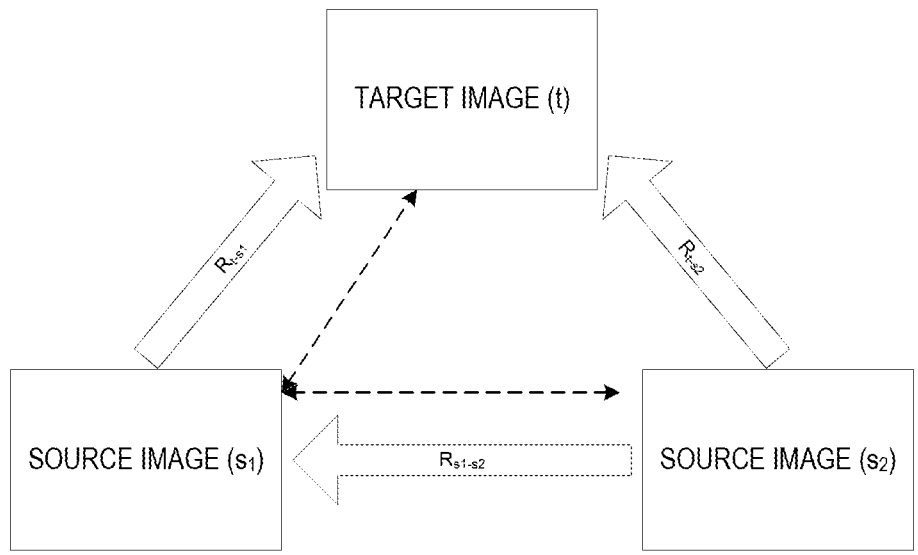
FIG. 3 is a block diagram illustrating a foundation for an estimated registration relationship.

At 204, an estimate of a third registration relationship between the third image volume $s_2$ and the second image volume t is generated. Specifically, the first registration relationship and the second registration relationship are combined to generate the estimate. Turning briefly to FIG. 3, illustrated is a block diagram depicting the relative arrangement of the first, second, and third registration relationships. As shown in FIG. 3, the first registration relationship $R_{t-s1}$ provides a mapping between corresponding locations of image volumes $s_1$ and t, the second registration relationship $R_{s1-s2}$ specifies a correspondence between locations of image volumes $s_2$ and $s_1$, and the third registration relationship $R_{t-s2}$ provides a mapping between corresponding locations of image volumes $s_2$ and t.

Intuitively, as a registration relationship identifies a location of an image volume and maps the location to a corresponding location in another image volume, one exemplary and non-limiting combination technique, referred to herein as a concatenation, can readily be illustrated. The dashed lines of FIG. 3 provide a path along registration relationships by which the estimate of the third registration relationship is derived. In other words, the dashed line represents a concatenation. Given a location $x_{s2}$ in image volume $s_2$, a corresponding point $x_{s1}$ in image volume $s_1$ can be determined via the second registration relationship $R_{s1-s2}$. Via the first registration relationship $R_{t-s1}$, a point $x_t$ in the target image volume t corresponding to point $x_{s1}$ in image volume $s_1$ is known. Accordingly, via the first and second registration relationship, i.e., via the concatenation thereof, a point in the target image volume t corresponding to the point $x_{s2}$ in image volume $s_2$ can be estimated.

Figure 4:
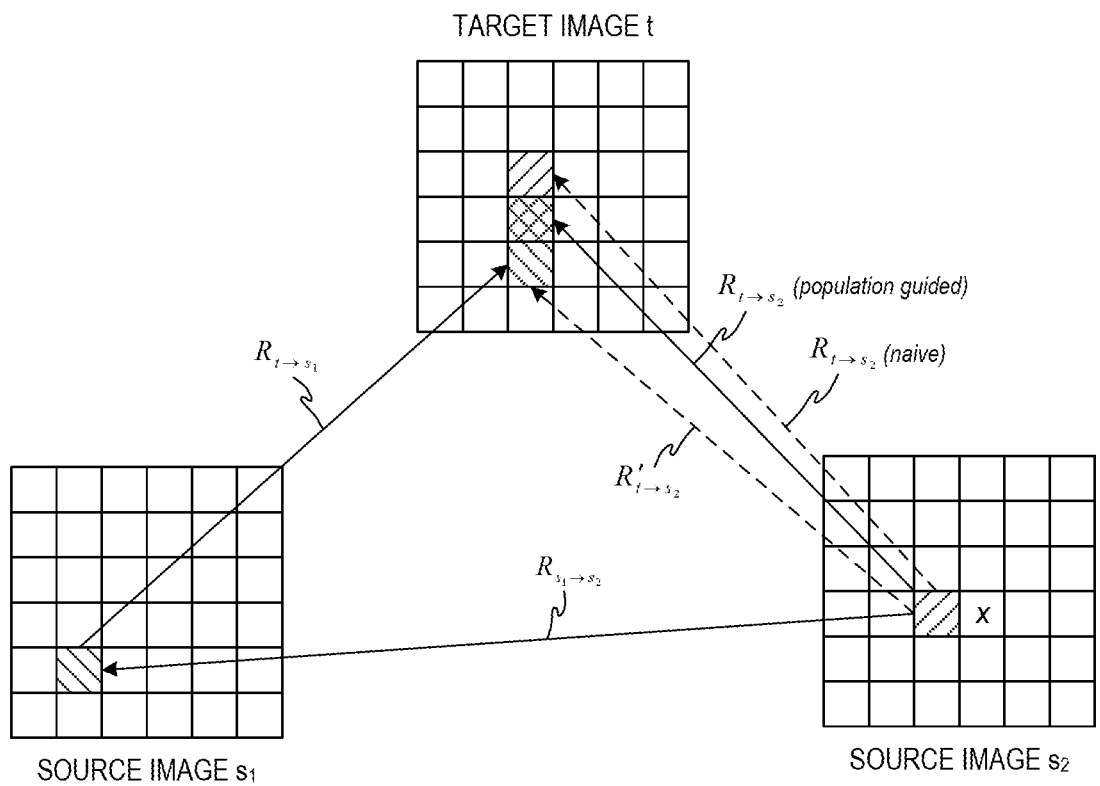
FIG. 4 is an exemplary, non-limiting illustration of utilizing an estimated registration relationship to register two image volumes.

Referring back to FIG. 2, at 206, the estimate is utilized to guide a direct determination of the third registration relationship. In addition to illustrating concatenation as described above, FIG. 4 further depicts the utilization of the estimate to provide population-guided registration in accordance with one or more aspects. As shown in FIG. 4, locations in source image $s_1$ and target image t corresponding to location x of source image $s_2$ are linked via various registration relationships. As described above, the estimated registration relationship $R'_{t-s2}$ is generated by a concatenation of the first and second registration relationship. That is, the estimated registration relationship $R'_{t-s2}$ maps location x to the location indicated by starting from location x, traversing along the second registration relationship $R_{s1-s2}$, and then traversing the first registration relationship $R_{t-s1}$.

Also shown in FIG. 4 is a naively generated registration relationship between the source image $s_2$ and the target image t. The naively generation relationship is determined without consideration of population forces, i.e., without utilizing the estimated relationship $R'_{t-s2}$. As shown in the simplified example of FIG. 4, by introducing population forces, i.e. by considering the information carried in the estimated relationship, a more accurate registration can be achieved. It is to be appreciated that FIG. 4 illustrates a high-level, generalized example of utilizing an estimated registration, and that the subject claims are not intended to be limited to estimated registrations merely being averaged with naively generated registrations. An alternative implementation, in connection with a non-limiting, exemplary registration technique is provided later.

As included in the above-described embodiments, the terms "image volume" and "registration" are generally used to indicate substantially any three-dimensional or two-dimensional image data and substantially any type of registration transform (e.g., rigid, affine, deformable, etc.), respectively. Accordingly, the concepts of concatenating registration relationships to derive estimated registrations and utilizing the estimated registrations to improve direct registrations can be applied to a variety of image data and registration types. In the exemplary embodiments described below, examples are provided with respect to deformable registrations of medical images. One of ordinary skill in the art would appreciate that the aspects and examples described below are application to other image data and registration transforms.

Figure 5:
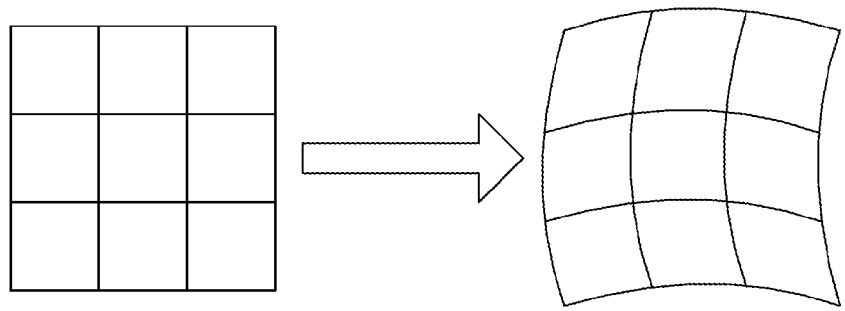
FIG. 5 illustrates an exemplary, non-limiting registration, such as a deformable registration.

A deformable registration typically involves a non-linear dense transformation or a spatially varying deformation field. FIG. 5 illustrates a simplified example of a transformation associated with a deformable registration. As shown, with deformable registrations, object transformations need not be limited to rotations, scaling, or other affine transformations. With deformable registrations, a number of degrees of freedom available to specify transformations can range from ten to millions.

Figure 6:
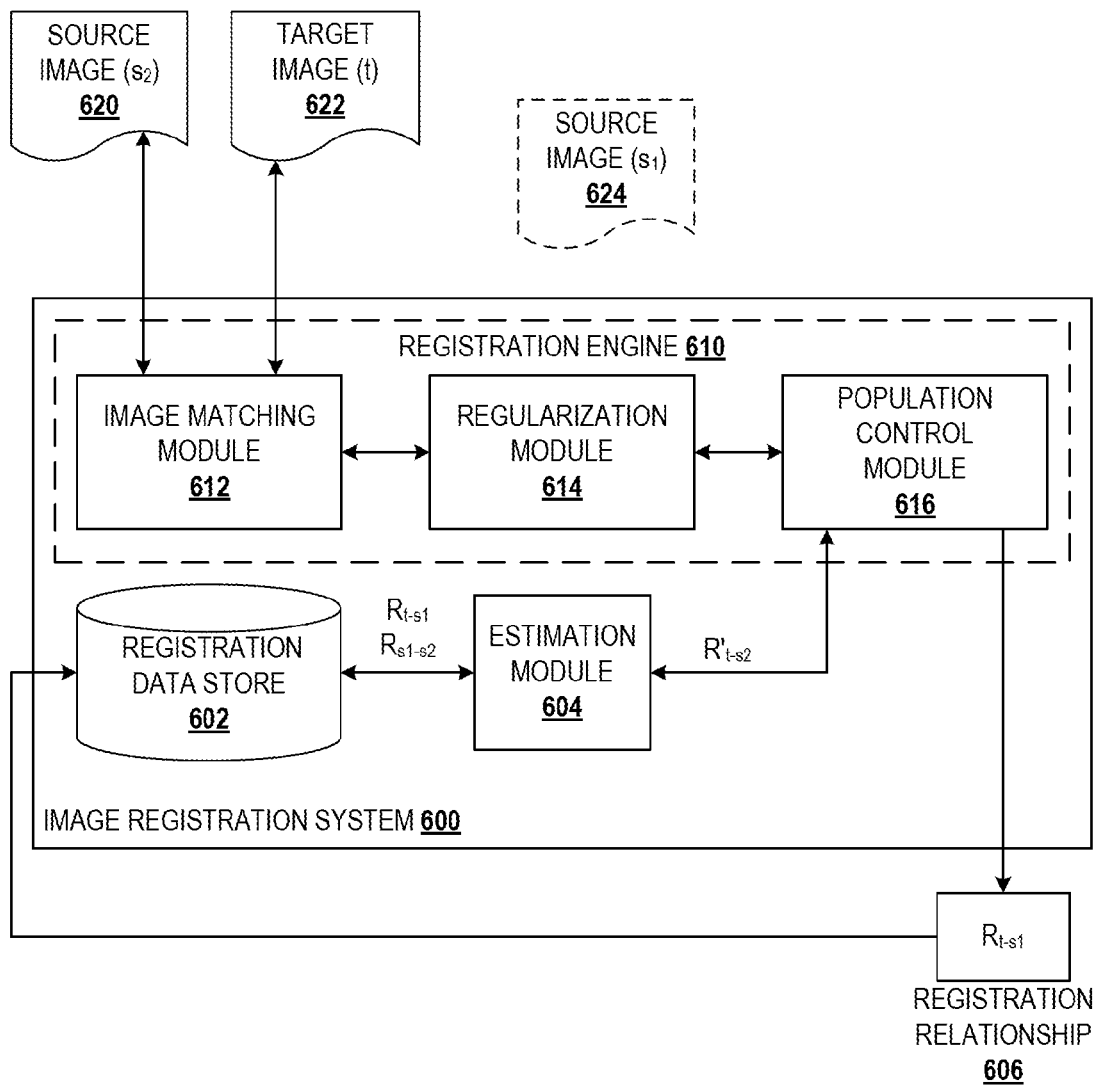
FIG. 6 is a block diagram of an exemplary, non-limiting image registration system that determines deformable registrations in accordance with one or more aspects.

Turning to FIG. 6, illustrated is an exemplary, non-limiting image registration system 600 that generates a deformable registration relationship 606 between a source image ($s_2$) 620 and a target image (t) 622 in accordance with one or more aspects. In accordance with an example described herewith, a source image ($s_1$) 624 is assumed to have been previously registered to target image 622 by the image registration system 600 and also registered to source image 620 by the image registration system 600. The image registration system 600 can include a registration data store 602 that retains the previously determined relationships, $R_{s1-s2}$ and $R_{t-s1}$, as well as other registrations already computed. Further, data store 602 can store newly generated relationships for use in later registrations.

As shown in FIG. 6, image registration system 600 also includes a registration engine 610 configured to determine registration relationships between at least two image volumes. The registration engine 610 includes several functional blocks configured to contribute or influence an overall registration relationship output by the image registration system 600. An image matching module 612 determines an image-based displacement for every voxel of source image 620 relative to target image 622. According to an example, the image matching module 612 can compare voxel intensities between the source image volume, e.g. source image 620, and the target image volume, e.g. target image 622. More particularly, in accordance with an aspect, image matching module 612 executes an optimization of an energy minimization problem. For instance, image matching module 612 can apply a gradient descent on a sum of square intensity differences of voxels. However, it is to be appreciated that other techniques can be utilized such as, but not limited to, an efficient minimization, or other fitness criteria can be applied.

A regularization module 614 is provided to constrain the displacements determined by the image matching module 612. Constraints imposed or enforced by the regularization module 614 facilitate ensuring that internal forces are obeyed in a reasonable manner. For instance, the regularization module 614 can prevent folding by ensuring that a given voxel does not displace outside of its neighbors. Regularization module 614 can provide such constraints in a variety of manners. For instance, regularization module 614 can directly add a term that influences the objective function being optimized. Alternatively, regularization module 614 can implement filtering, such as Gaussian smoothing or spline fitting, to constrain displacements. It is to be appreciated that other suitable regularization techniques can be utilized herein without limit to the techniques described above.

A population control module 616 is provided to further refine displacements of voxels based on estimated registrations derived from previously determined relationships. For example, an estimation module 604 can generate an estimated relationship $R'_{t-s2}$ based on previously generated relationships $R_{s1-s2}$ and $R_{t-s1}$. The population control module 616 applies the estimated relationship to determination made by the image matching module 612 and/or regularization module 614 to output the final registration relationship 606. Population control module 616 can provide such constraints in a variety of manners. For instance, population control module 616 can directly add a term that influences the objective term being optimized. Alternatively, population control module 616 can implement a bias term to constrain displacements after each iteration of an optimization.

While FIG. 6 depicts registration engine 610 as having disparate functional modules performing individual actions, it is to be appreciated that the functional modules, e.g. image matching module 612, regularization module 614, and the population control module 616 can be implemented as a single functional module. According to another aspect, the registration engine 610 can be implemented such that one or more functions of the image matching module 612, regularization module 614, and the population control module 616 are simultaneously and jointly performed.

Figure 7:
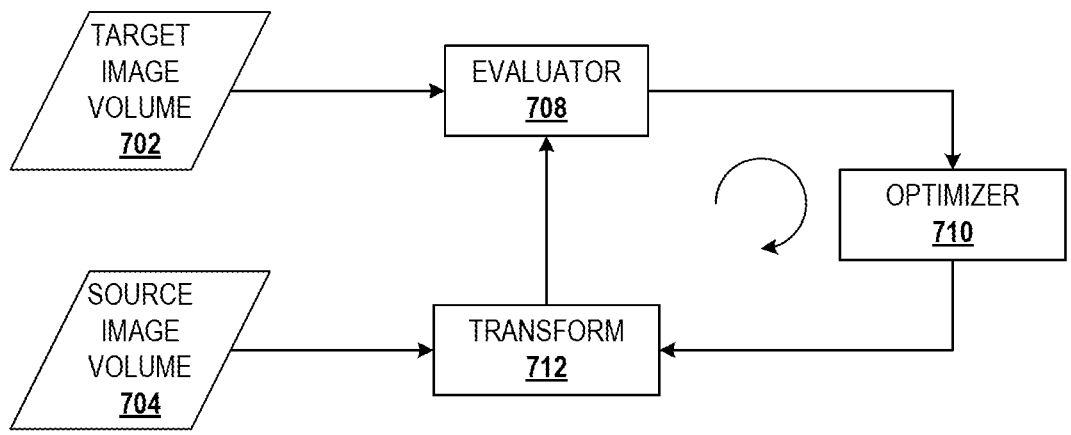
FIG. 7 is a block diagram of an exemplary, non-limiting framework for deformable registrations in accordance with one or more aspects.

By way of example, consider a registration framework 700 shown in FIG. 7, which can be one possible implementation of the registration engine 610. Deformable registrations can be determined by an optimization strategy. A source image volume 704 is modified by a transform 712 in accordance with a set of initial transform parameters. In one example, transform 712 can initialize to perform an identity transform on source image volume 704 to begin the optimization that leads to a final registration relationship. The source image volume 704, as modified by the transform 712, and the target image volume 702 are compared by an evaluator 708 which outputs a fitness value. The evaluator 708 determines the fitness value in accordance with a predetermined function, which can be based on voxel properties of source image volume 704 and target image volume 702. The fitness value is input to an optimizer 710 which updates a set of transform parameters utilized by the transform 712. The optimizer 710 determines the updated transform parameters according to the fitness value and an objective function. This process from transform 712 to evaluator 708 to optimizer 710 can be iteratively repeated until a convergence criterion is satisfied. For instance, when the optimizer 710 determines that no further modifications to the transform parameters will result in an improvement, the loop breaks and the final registration relationship (i.e., set of transform parameters) is output.

With the above described framework, the various functions of the image matching module 612, regularization module 614, and the population control module 616 can be mathematically introduced into the optimizer 710 and/or the evaluator 708. For example, regularization can be accomplished by introducing a regularization term to a function utilized by the evaluator 708. This regularization term adjusts a determined fitness value beyond the influences of only image-based forces (i.e., voxel properties). Accordingly, the regularization term facilitates curtailing extreme displacements of voxels relative to displacements of neighboring voxels. In another example, regularization can be achieved through modification of the objective function employed by the optimizer 710. Similarly, population forces can be introduced by modifying the evaluator function and/or the objective function. For instance, the objective function of the optimizer 710 can consider estimated relationships provided by concatenations of related registrations, as described above. According to one example, estimated relationships can be averaged and adjustments considered by the optimizer 710 can be penalized by the objective function based on a distance between the average estimated registration and the proposed registration, after adjustment.

In another example, it is possible that estimated registrations cluster at disparate candidate registrations, particularly as a number of disparate source volumes involved in concatenation increases. Accordingly, the objective function can be devised to encourage registration adjustments converging on any of the clusters. For instance, the objective function can penalize adjustments based on a total distance to a proposed registration relationship from the closest N estimations (clusters), where N is an integer greater than or equal to one.

The exemplary embodiments presented above are described relative to an example of a single target volume and two source volumes. It is to be appreciated that the above described embodiments can be extended to sets of target volumes and sets of source volumes. For example, a library of source image volumes can be built over time as a patient is successively scanned to track progression of a disease and/or treatment. As each volume is obtained, it can be registered to a target volume. However, as it is likely each source image volume undergoes a similar registration, it is desirable to glean any information learned from the prior registrations to the target volume. Accordingly, the population-guided registration techniques described above can be applied in this situation.

Figure 8:
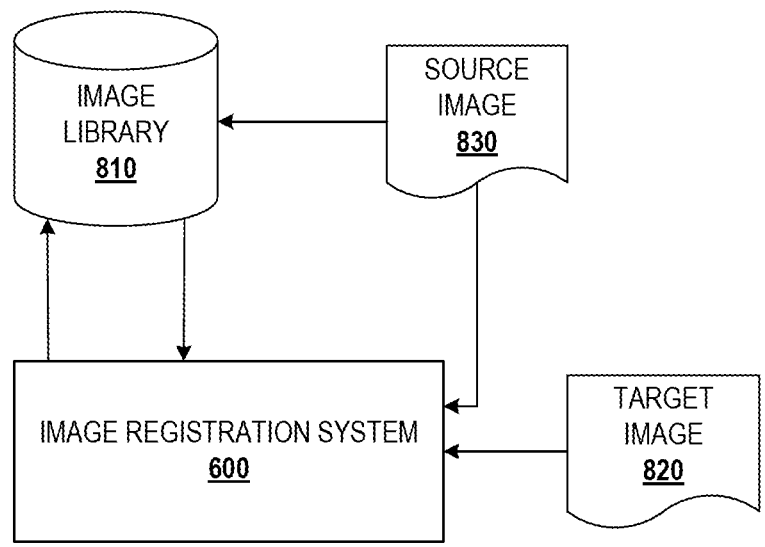
FIG. 8 is a block diagram of an exemplary, non-limiting image registration system according to an aspect.

Referring to FIG. 8, a non-limiting, exemplary system is illustrated that includes image registration system 600 described above. According to this embodiment, an image library 810 is provided that includes a library of source image volumes acquired from one subject or multiple subjects. In conventional systems, registering the image library 810 to a target image volume 820 involves computing a set of registration relationships, each of which maps one source image volume of the image library 810 to the target image volume 820. However, image registration system 600 performs population-guided registration as described previously. To enable population guiding, a set of intra-library registration relationships are generated by the image registration system 600. The set of intra-library registration relationships may include a registration relationship for every pair of source image volumes in image library 810. It is to be appreciated that inverse relationships can be included or excluded, as desired.

As with the conventional system, the image registration system 600 can generate, with or without population control, a set of relationships between each source image volume of image library 810 and the target image volume 820. With the two sets, the image registration system 600 can build a set of estimate relationships by concatenating each member of the set of intra-library relationships with each relevant member of the set of relationships to the target.

Figure 9:
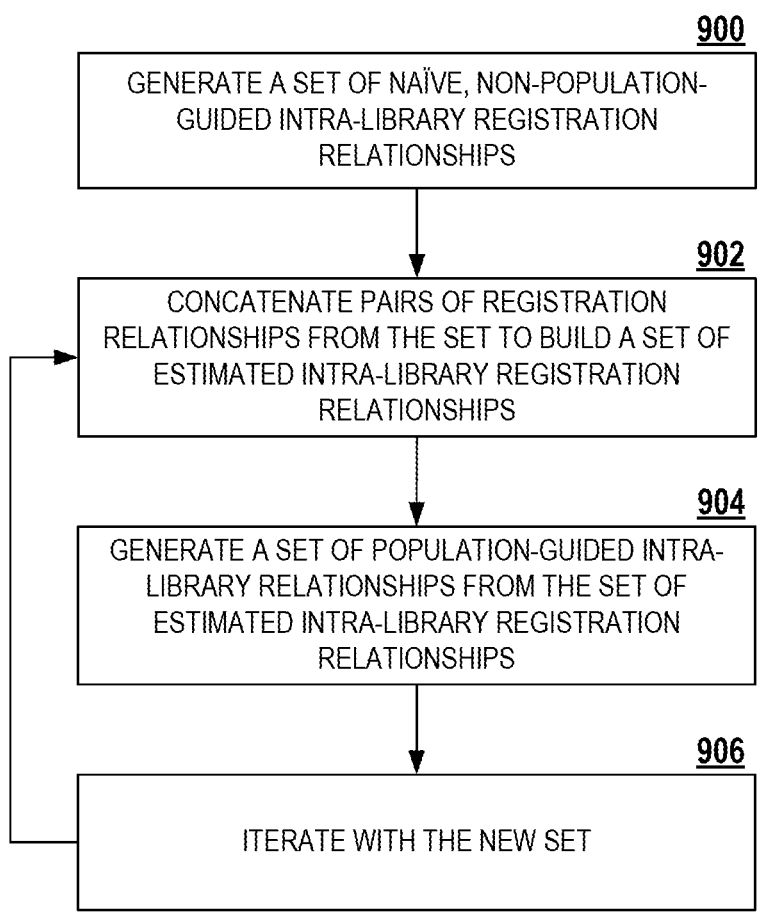
FIG. 9 is a flow diagram illustrating an exemplary, non-limiting embodiment for iteratively generating intra-library registration relationships.

In accordance with another aspect, it is to be appreciated that the set of intra-library relationships and the set of relationships to the target need not be naively generated without population control. Turning to FIG. 9, an exemplary embodiment for iteratively building the set of intra-library registrations, with population control, is illustrated. At 900, the process is bootstrapped by generating a set of naïve, non-population-guided intra-library registration relationships for each pair of sources in the image library 810. At 902, pairs of registration relationships from the naively generated set are concatenated to build a set of estimated intra-library registration relationships for each pair of sources in the image library 810. At 904, the set of estimated relationships is employed to generate a set of population-guided registration relationships. At 906, the process can iterate, i.e. return to 902, to successively build the set of intra-library registration relationships with increasingly sophisticated estimations.

A similar technique can be utilized to build the set of registration relationships between the target image volume 820 and each source image volume in the image library 810, wherein this set of registration relationships is simultaneously and iteratively built in parallel with the intra-library relationships. In this instance, registration relationship concatenated to form estimates can be generated and stored at a course resolution to increase resource efficiency.

Referring back to FIG. 8, the target image volume 820 and all registration relationship related thereto can be added to image library 810. Accordingly, when a new source image volume 830 is acquired, population-derived information associated with the target image volume 820 and the sources of image library 810 is available to enable an enhanced registration of the new source image volume 830 to the target image volume 820. It is to be appreciated that, to further enable the utilization of population-derived information in the registration of the new source image volume 830 to the target image volume 820, the source image volume 830 is registered to each image volume in the image library 810 (or vice versa). The registration relationships between the new source image volume 830 and the volumes of the image library 810 can be determined in parallel with the relationships mentioned above, or can be determined afterwards as the new source image volume 830 becomes available, for example.

Figure 10:
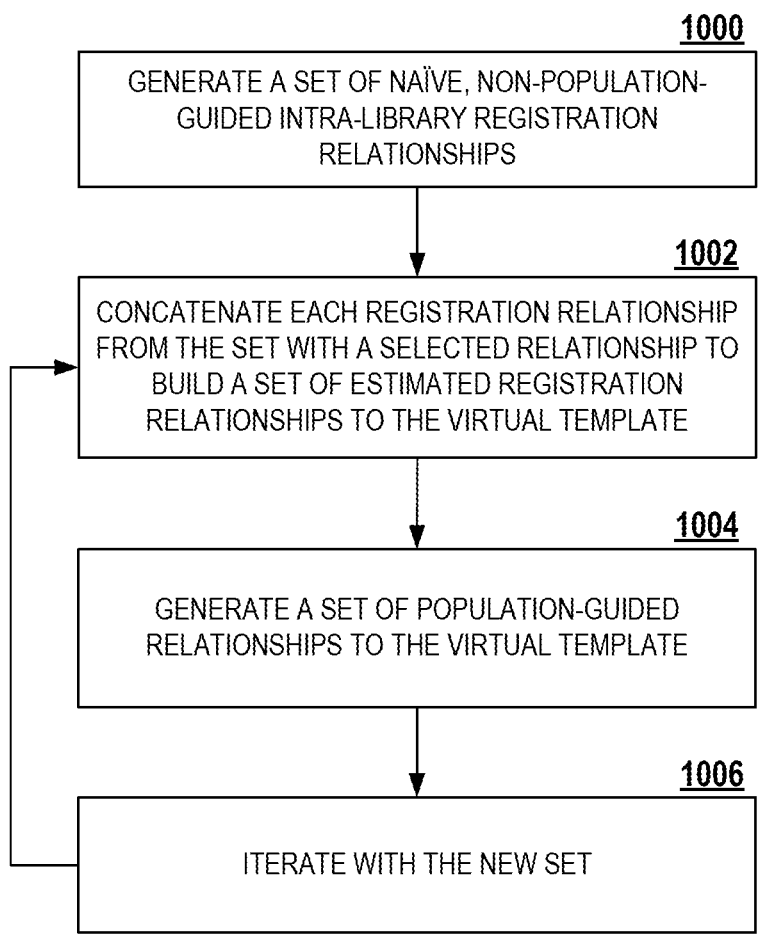
FIG. 10 is a flow diagram illustrating an exemplary, non-limiting embodiment for utilizing a virtual reference template.

According to yet another aspect, population-guided registration enables registration to a virtual reference template volume, which can be void of any image data itself. While reference templates can be essentially any image volume such as a single image volume, an image volume selected as being the most representative, an average of a set of image volumes in a library, or the like, these conventional template selection techniques can introduce template or selection bias to subsequent registrations. Turning to FIG. 10, which illustrates an embodiment for iteratively building the virtual template, a set of naïve, non-population-guided intra-library registration relationships for each pair of sources in the image library 810 is generated at 1000. At 1002, each registration relationship from the set are concatenated with a selected registration relationship, which can be an identity registration relationship or any other computed registration relationship to a real or virtual template to generate a set of estimated registration relationships to the template. At 1004, a set of population-guided registrations to the template are generated based on the estimates. At 1006, the process is iterated with each successively generated set of refined relationships. Moreover, with each iteration, it is to be appreciated that the selected registration relationship can be updated or otherwise re-selected as the iterative registrations hone in on the virtual template.

Figure 11:
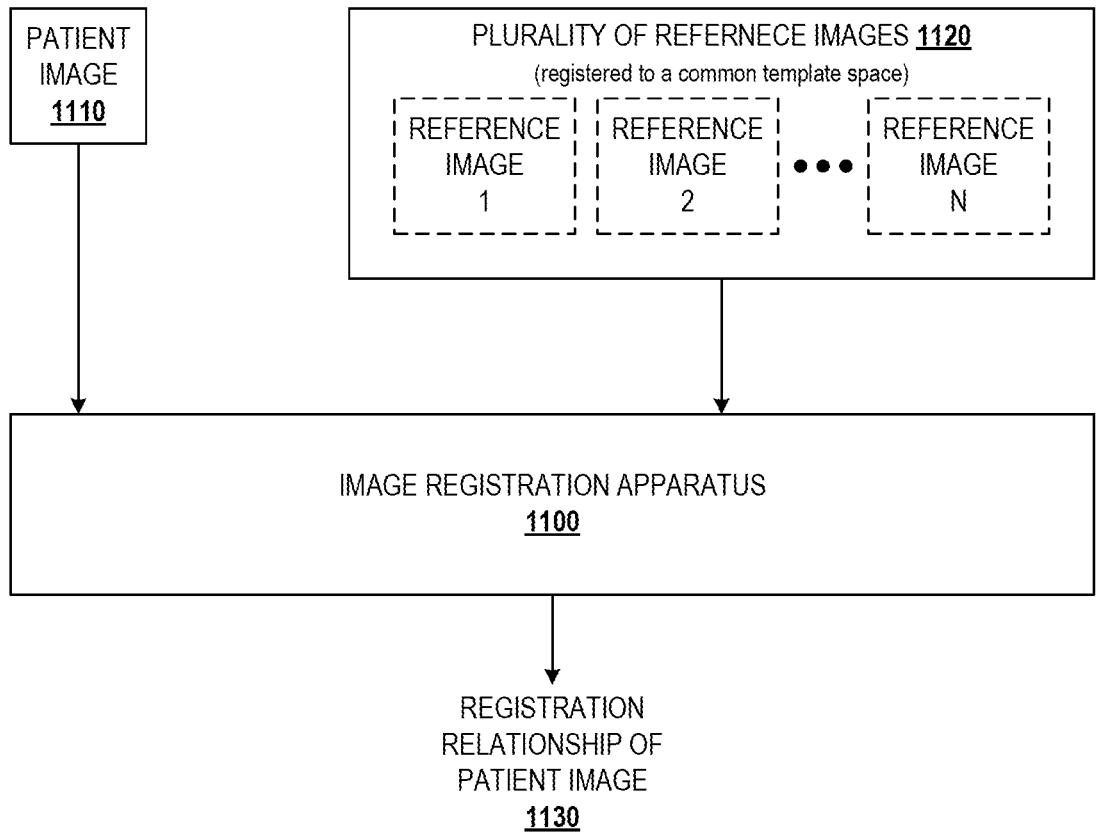
FIG. 11 is a block diagram of an exemplary, non-limiting image registration system configured to execute multiple, simultaneous registrations of an image volume to a plurality of reference image volumes.

In a further aspect, population-guided registrations can be extended to enable multiple, simultaneous registration of a source image to a plurality of reference volumes. FIG. 11 illustrates an image registration system 1100 configured to execute multiple, simultaneous registrations of a patient image volume 1110 to a plurality of reference image volumes 1120. Each of the plurality of reference image volumes 1120 is registered to a common space. Image registration system 1100 is configured to execute a modification of population-guided registration to simultaneously register the patient image volume 1110 to the plurality of reference images 1120. To highlight this technique, consider a simplified example of an affine registration. During the registration and, specifically, during the optimization of registration parameters, respective registration information of the patient image volume 1110 to each of the reference image volumes can be average to form a final score subject to optimization. Accordingly, each reference image volume exerts an equal influence on registration of the patient image volume 1110. Alternatively, the image matching scores between the patient image 1110 and the plurality of reference images can be combined, e.g. averaged, to compute a single matching score for use by an optimization engine. For deformable registrations, an average of a similarity of a subregion around a proposed patient landmark compared with a subregion around a corresponding landmark of each reference image volume can be computed. Alternatively, during optimization, each proposed registration relationship can be used to compute a matching score to each reference image and these scores combined, e.g. averaged, and optimization performed on this combined score.

Exemplary Computing Device

Figure 12:
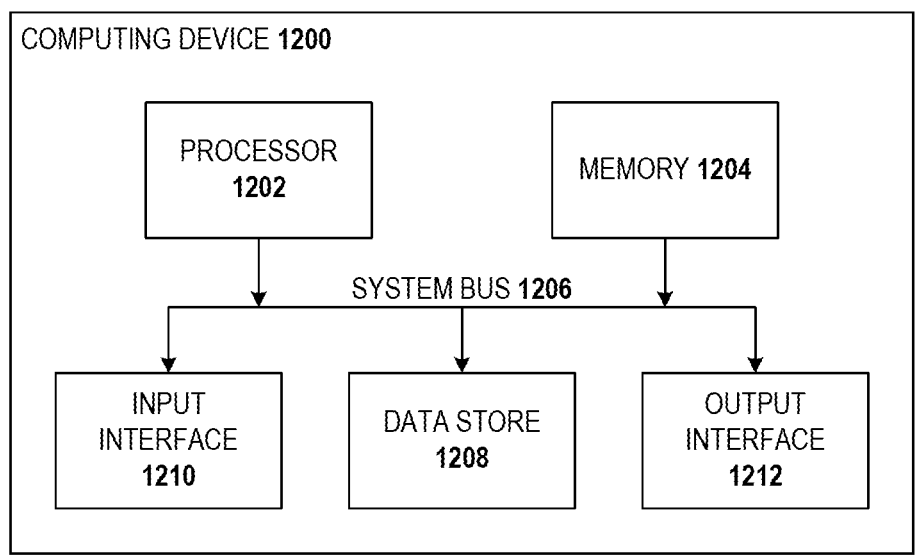
FIG. 12 illustrates a block diagram of an exemplary, non-limiting computing device or operating environment in which one or more aspects of various embodiments described herein can be implemented.

Referring now to FIG. 12, a high-level illustration of an exemplary computing device 1200 that can be used in accordance with the systems and methodologies disclosed herein is illustrated. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206.

The computing device 1200 additionally includes a data store 1208 that is accessible by the processor 1202 by way of the system bus 1206. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

While methodologies are described herein as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable storage medium or media. The computer-executable instructions can include a routine, a sub-routine, programs, a thread of execution, and/or the like. Still further, results of acts of the methodologies can be stored in a computer-readable storage medium, displayed on a display device, and/or the like.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something." For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent structures and techniques known to those of ordinary skill in the art. Furthermore, to the extent that the terms "includes", "has", "contains", and other similar words are used herein, such terms are intended to be inclusive in the a manner similar to the term "comprising" as an open transition word without precluding any additional elements when employed in a claim.

Various functions described herein can be implemented in hardware, software, or any combination thereof. If implemented in software, the functions can be stored on or transmitted over as one or more instructions or code on a computer-readable medium. Computer-readable media includes both computer-readable storage media and communication media including any medium that facilitates transfer of a computer program from one place to another. A computer-readable storage media can be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Also, a connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims.

What is claimed is:

1. An image registration system, comprising:
   a registration engine configured to:
      obtain a first set of registration relationships respectively mapping between respective source images of a set of images and at least one target image;
      determine a second set of registration relationships between respective pairs of source images in the set of images;
      generate a set of estimated registration relationships via respective combinations of a relationship from the first set with a relationship of the second set; and
      register at least one source image from the set of images to the at least one target image based in part on an associated estimated registration relationship from the set of estimated registration relationships; and
   a computer-readable storage medium, wherein the registration engine comprises computer-executable instructions stored on the computer-readable storage medium.

2. The image registration system of claim 1, wherein the registration engine determines deformable registrations between images.

3. The image registration system of claim 1, wherein the registration engine utilizes the associated estimated registration relationship as a final registration relationship between the at least one source image and the at least one target image.

4. The image registration system of claim 1, wherein a combination of a first registration relationship with a second registration relationship correlates a first location of a first image to a second location of a second image via a third location of a third image,
   wherein the first registration relationship maps the first location of the first image to the third location of the third image, and
   the second registration relationship maps the third location of the third image to the second location of the second image.

5. The image registration system of claim 1, wherein the registration engine is further configured to determine an initial set of registration relationships between respective pairs of source images in the set of images, the initial set being distinct from the second set of registration relationships.

6. The image registration system of claim 5, wherein the registration engine is further configured to combine respective pairs of registration relationships from the initial set to build an initial set of estimated registration relationships between respective pairs of source images in the set of images.

7. The image registration system of claim 6, wherein the registration engine is further configured to refine the initial set of registration relationships based on the initial set of estimated registration relationships to produce a refined set of registration relationships.

8. The image registration system of claim 7, wherein the registration engine is further configured to iteratively combine respective pairs of registration relationships from the refined set and update the refined set based on results of a combination.

9. The image registration system of claim 1, wherein the at least one target image is a plurality of target images registered to a common space, and
   wherein the registration engine is further configured to register source images of the set of images to the plurality of target images to generate a final registration relationship between the source images and the common space, the final registration relationship is based on respective registration relationships between the source images and each target image.

10. The image registration system of claim 1, wherein the at least one target image is a plurality of target images registered to a common space, and
   wherein the registration engine is further configured to register source images of the set of images to the plurality of target images to generate a final registration relationship between the source images and the common space, the final registration relationship is based on respective registration parameters between the source images and each target image.

11. The image registration system of claim 10, wherein, as a result of registration based on the respective registration parameters, the source images are registered to the common space according to an equal contributing influence from each of the plurality of target images.

12. The image registration system of claim 1, wherein the registration engine is further configured to determine, simultaneously and iteratively, the first set of registration relationships and the second set of registration relationships.

13. The image registration system of claim 1, wherein the registration engine is further configured to guide a registration of the at least one source image from the set of images to the at least one target image towards the associated estimate registration relationship.

14. The image registration system of claim 1, wherein the computer-readable storage medium further stores thereon a library comprising the set of images, and
wherein after registration of the at least one source image to the at least one target image, a resultant registration relationship and the at least one target image are added to the library.

15. A method of registering image volumes, comprising:
registering a first image volume to a second image volume;
registering a third image volume to the first image volume;
combining a first registration relationship, between the first image volume and the second image volume, with a second registration relationship, between the third image volume to the first image volume, such that a combination of the first and second registration relationship is an estimated registration relationship between the third image volume and the second image volume; and
registering the third image volume to the second image volume based at least in part on the estimated registration relationship.

16. The method of claim 15, wherein registering comprises performing a deformable registration operation.

17. The method of claim 15, wherein the first image volume, the second image volume, and the third image volume are medical images.

18. The method of claim 15, wherein the first image volume and the third image volume are stored in a common library, the method further comprising pre-registering the third image volume to the first image volume.

19. The method of claim 18, further comprising storing a resultant registration relationship in the common library.

20. A non-transitory computer-readable storage medium having storing computer-executable instructions that, when executed by a processor, configure the processor to:
generate an estimated registration between a first source image and a reference image by combining a first registration between the first source image and a second source image and a second registration between the second source image and the reference image; and
compute a direct registration between the first source image and the reference image based at least in part on the estimated registration,
wherein, as a concatenation of the first registration and the second registration, the estimated registration maps a first location of the first source image to a corresponding location of the reference image via an intermediary location of the second source image, and
the first registration maps the first location to the intermediary location and the second registration maps the intermediary location to the corresponding location of the reference image.

21. The non-transitory computer-readable storage medium of claim 20, further storing computer-executable instructions to configure the processor to utilize the estimate registration to constrain a displacement generated through the direct registration between the first source image and the reference image.

* * * * *